Oct. 16, 1951          J. YOUHOUSE          2,571,643

APPARATUS FOR TESTING THERMOSTATIC CONTROL DEVICES

Filed June 2, 1945          3 Sheets-Sheet 1

INVENTOR
Joseph Youhouse
BY
ATTORNEYS

Patented Oct. 16, 1951

2,571,643

UNITED STATES PATENT OFFICE 2,571,643

APPARATUS FOR TESTING THERMOSTATIC CONTROL DEVICES

Joseph Youhouse, Fairfield, Conn., assignor to Casco Products Corporation, Bridgeport, Conn., a corporation of Connecticut Application June 2, 1945, Serial No. 597,257

19 Claims. (Cl. 209—72)

This invention relates to methods of and apparatus for testing, checking and segregating thermostatic devices.

The invention is shown in connection with small circuit-making and circuit-breaking thermostats of a type used in heating pads and the like. However, this showing is not to be construed as a limitation, since the apparatus and method has utility when used with other types of thermostatic devices.

Thermostats as used in heating pads function to reduce the fire hazard by preventing dangerous overheating of the pads, and also function to regulate the pad temperatures, so that any of a number of different automatically controlled heats may be obtained, including low, medium, high, etc. These thermostats are initially adjustable, that is, adjustable before the pad is completely assembled, and are usually preset to open and close the pad circuit within predetermined narrow temperature ranges. Often the presetting of the thermostats may not be sufficiently accurately accomplished, and when the pad and thermostats are completely assembled it is found that the pad temperatures are not accurate to the desired extent.

Heretofore it has been proposed to check or test the thermostats after their initial setting by immersing them a large number at a time in a warm bath, and noting the response of the devices to the heat, whereupon the improperly set thermostats are manually selected and removed from the lot, for resetting. While this system was generally satisfactory in detecting the faulty thermostats, it was costly in that it consumed considerable time, and involved fluid-containing vessels which were inconvenient and the temperature of which had to be closely watched and controlled. Also, the thermostats were checked under conditions quite different from those found in their eventual use.

According to this invention, an improved method and apparatus are provided which obviate the disadvantages of thermostat testing, checking and segregating as outlined above and heretofore practiced thereby reducing considerably the ultimate cost of producing correctly set and adjusted thermostats. According to the improved method and apparatus of this invention the testing may be done by continuous or intermittent movement of the thermostats being tested, the heating, determining of the thermostat response, and segregation of the thermostats being carried out as the latter are moved along a given path of travel, and therefore the time required for the entire procedure is very little, representing a saving in the labor cost of producing correctly set thermostats.

In addition, the various steps in the procedure are carried out automatically, eliminating the necessity for employing skilled workers, and eliminating errors due to the human element. Therefore, all the thermostats passing the test will be accurately set and adjusted, and when incorporated in the heating pads, will accurately control the temperature ranges of the latter and also prevent dangerous overheating.

The thermostats as checked, tested and segregated according to the present invention, are not subjected to wetting, as by immersion in a fluid, and therefore the testing operations are performed under conditions more nearly like actual working conditions than was heretofore possible. This also reduces the likelihood of error, and results in uniformity of the thermostats which are selected and segregated as being correctly set.

The segregation of the thermostats is carried out in such a manner that the thermostats set too low are grouped together, and the thermostats set too high placed in another group. Therefore, the subsequent necessary readjustment of the thermostat settings may be quickly and conveniently made, and the thermostats again checked with very little loss of time, and without the use of extra equipment. For example, the thermostats which have been rejected as too low may be readjusted by turning up the adjusting screw slightly, and these readjusted thermostats may then be again passed through the apparatus of this invention. If the slight readjustment made is sufficient to correct the thermostat setting, the thermostat will pass through the apparatus and be deposited in the correctly set group. If the readjustment has been insufficient, the thermostat will be again rejected and placed in the "low" group; if the readjustment has been too great, the thermostat will be rejected and placed in the group indicated as being too high. In either case, a further subsequent slight adjustment may be made and the thermostat again passed through the apparatus, whereupon it will in all likelihood be found to be correctly set.

In the apparatus of the invention the heating of the thermostats may be accomplished by conduction radiation, or convection, or a combination of these. However, as disclosed in the embodiment of the invention illustrated herein, the heating is preferably accomplished by high-frequency induction means. By the use of high-frequency induction, a more rapid and predicable as well as a cleaner and safer heating of the thermostats is obtained, and results are uniformly more dependable than with other types of heating because the rate of heating by induction is constant. The high-frequency field is particularly suitable to the heating of members such as the flat or relatively thin bimetallic operators of thermostats.

Another feature of the invention is the provision of clamping means carried by the belt whereby the thermostats may be easily and quickly mounted on the belt, and may be automatically discharged from the latter, after successively passing the tests, the mounting and discharge being carried out at the places where the belt passes over its supporting and driving pulleys. The thermostat clamping means carried by the belt are in the form of cleats secured along the outside surface of the belt, and as the latter passes over a pulley the spacing between the cleats becomes sufficiently greater so that the thermostats are automatically released and freed from restraint. At the discharge end of the apparatus, therefore, the thermostats may automatically drop off the belt under the urging of gravity, and at the intake end of the apparatus an operator may quickly and conveniently place thermostats on the belt between the cleats due to the increased spacing at the head pulley.

A novel means is provided by the invention for determining the response of the thermostatic devices to heating while the devices are in transit, and for removing the devices from the predetermined path of travel if their settings are not correct. This means includes contact members associated with the belt cleats, advantage being taken of the insulating character of the belt or carrier whereby a simple circuit arrangement may be provided for automatically checking and segregating the devices.

Other features and advantages will hereinafter appear.

In the accompanying drawings, showing one embodiment of the invention.

Figure 1:
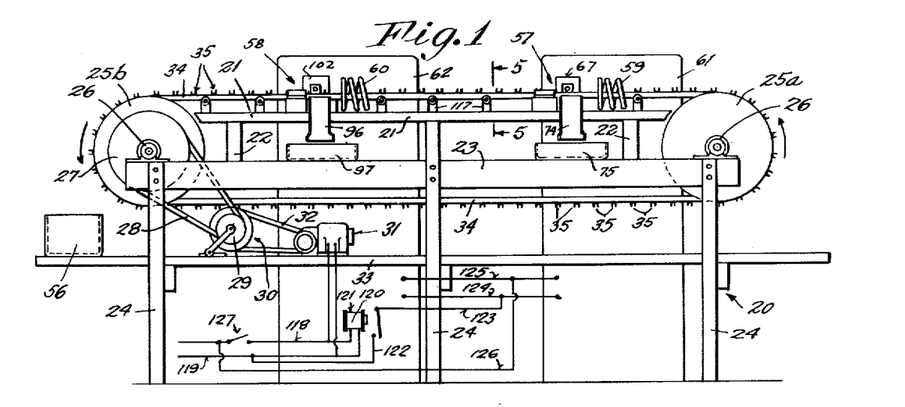
Figure 1 is a side elevation, on a reduced scale, of the thermostatic testing and segregating apparatus of the present invention.

Referring to Fig. 1, the thermostat testing and segregating apparatus of the invention comprises a frame 20 having a horizontal upper table 21 mounted on a plurality of legs 22, and having a sub-table 23 carrying the table 21 and in turn supported by legs 24. At the opposite ends of the sub-table 23 a pair of pulleys 25a and 25b is provided, mounted in journals 26 so as to be rotatable in a common vertical plane.

The left-hand pulley 25b, Fig. 1, is powered through a belt drive comprising a pulley 27 carried on the same shaft with the pulley 25b and rigid therewith, a belt 28, and the drive pulley 29 of a speed changer 30. Power is supplied by an electric motor 31 having reduction gearing connected with the speed changer 30 by a belt 32. The motor 31 and speed changer 30 are mounted on a horizontal shelf 33 secured to the legs 24 as shown.

According to this invention a novel thermostat supporting and conveying means is provided in the form of an endless V-belt 34 which is passed over the pulleys 25a and 25b, being driven by the latter pulley. The belt 34 is provided with a plurality of clamping members or cleats 35 secured along its outer surface at regular intervals as shown.

Figures 2, 3, 4:
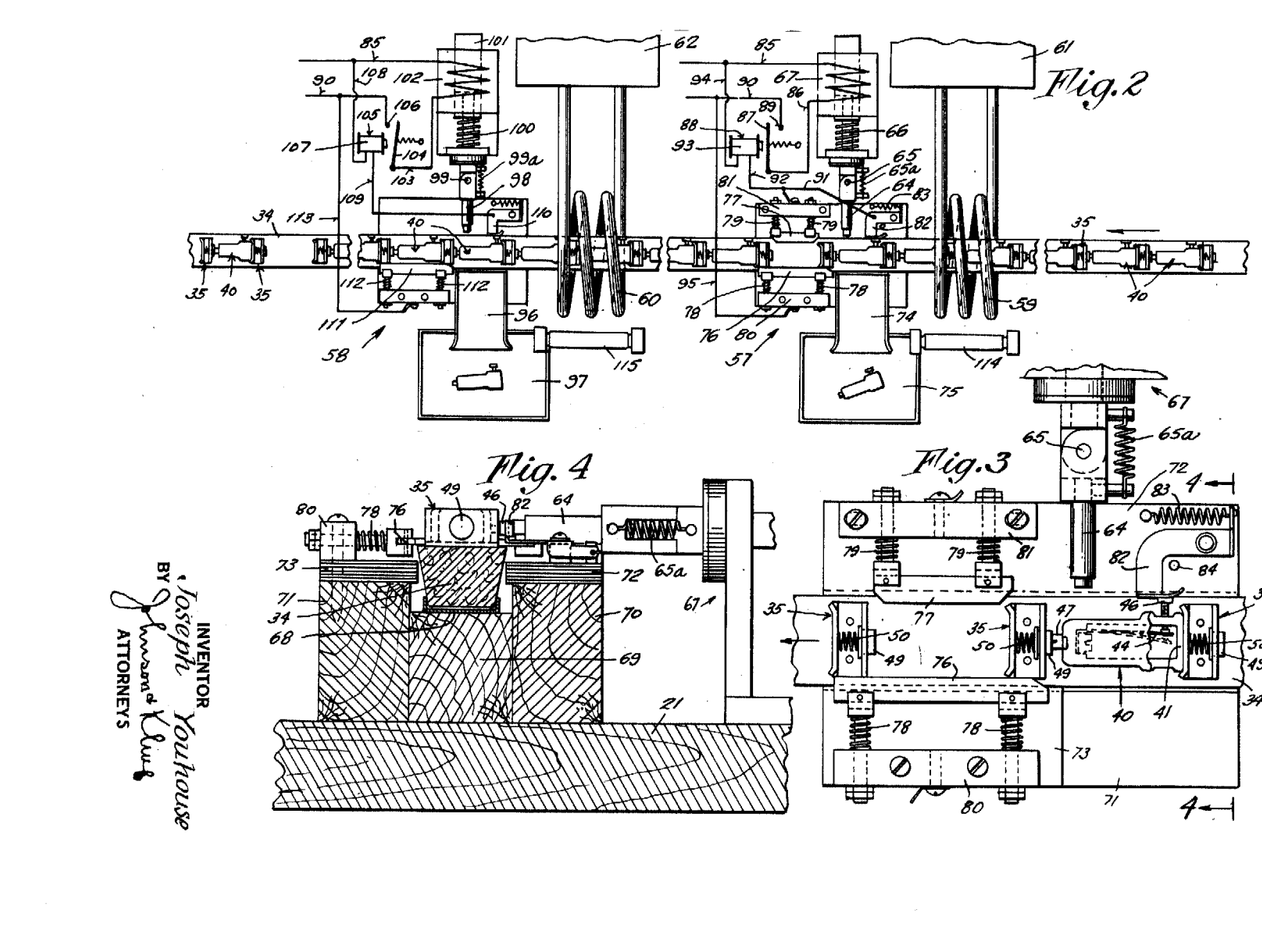
Fig. 2 is a fragmentary plan view, on a larger scale, of the apparatus of the invention, showing the stations for rejecting both "high" and "low" thermostats, and showing the heating means associated with the conveying belt.
Fig. 3 is a fragmentary plan view, further enlarged, of the station for rejecting the thermostats set too low.
Fig. 4 is fragmentary section taken on the line 4—4 of Fig. 3.
Figures 6, 7:
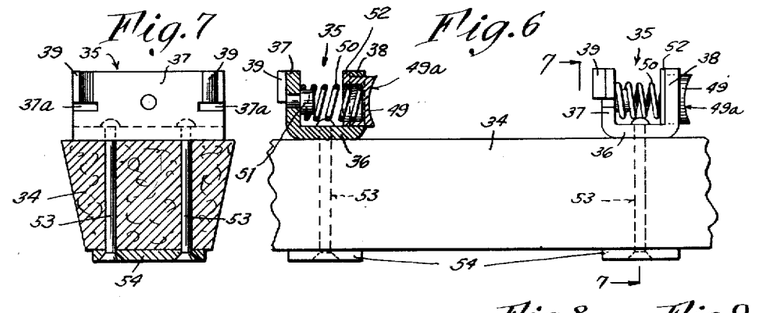
Fig. 6 is a fragmentary part-section, part-elevation of the conveying belt and clamping members or cleats secured thereto.
Fig. 7 is a section taken on the line 7—7 of Fig. 6.

Referring to Figs. 6 and 7, all of the cleats 35 are identical with each other, and each cleat comprises a channel-shaped piece of metal having a base portion 36 and walls 37 and 38. As shown in Figs. 3 and 7, the foremost walls 37 of the cleats are provided with short horizontal cuts 37a in their ends, and the upper end portions of the walls are bent outwardly at an angle to form ears 39 which function to nest thermostats 40 placed between the cleats, the ends 41 of the thermostats, Fig. 3, being snugly received between the ears 39.

Figure 8:
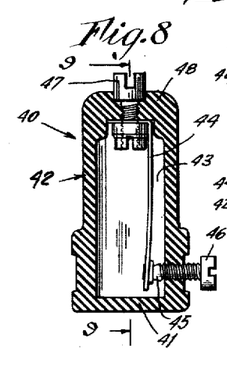
Fig. 8 is a horizontal section taken along the central plane of a thermostat such as used in the apparatus.
Figure 9:
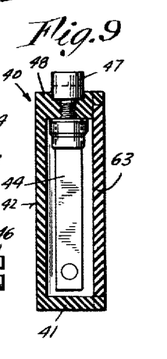
Fig. 9 is a section taken on line 9—9 of Fig. 8.

As shown in Figs. 8 and 9, each of the thermostats 40 comprises an elongate molded housing 42 having a recess 43 therein in which a bimetallic arm 44 is mounted for cooperation with the inner end 45 of a contact and adjusting screw 46. The screw 46 serves as one of the terminals of the thermostat 40, the other terminal comprising a bolt 47 extending through the end wall 48 of the thermostat, the bolt anchoring the end of the bimetallic arm 44.

For the purpose of engaging the terminal bolts 47 of the thermostats 40, the cleats 35 are provided with yieldable tubular plungers 49 which extend through apertures in the rear walls 38 of the cleats.

The plungers 49 are charged by compression springs 50 which extend into and are confined by the bores of the plungers and are also positioned by shouldered pins 51 carried by the walls 37 of the cleats. The plungers 49 have flanges 52 engaging the inside surfaces of the walls 38, which limit the extending movement of the plungers to the positions shown in Fig. 6. Preferably the faces 49a of the plungers are made concave so that they may centralize and to an extent nest the terminals 47 of the thermostats.

For securing the cleats 35 to the belt 34 the bottom portions 36 of the cleats are apertured to receive rivets 53 which pass through the belt and are headed-over on clamping plates 54, Figs. 6 and 7.

According to this structure, the thermostats 40 may be yieldably frictionally held on the belt 34 by being located between a pair of adjacent cleats 35 in such a manner that the plunger 49 of one cleat will engage and electrically connect with the terminal bolt 47 of thermostat, and the wall 37 of the following cleat will engage and nest the wall 41 of the thermostat. When in this position, the thermostat 40 will cause the plunger 49 to be retracted or depressed an extent, compressing the spring 50, and the latter will thereby maintain a pressure on the thermostat and cause the same to be frictionally held in place.

Figures 10, 11:
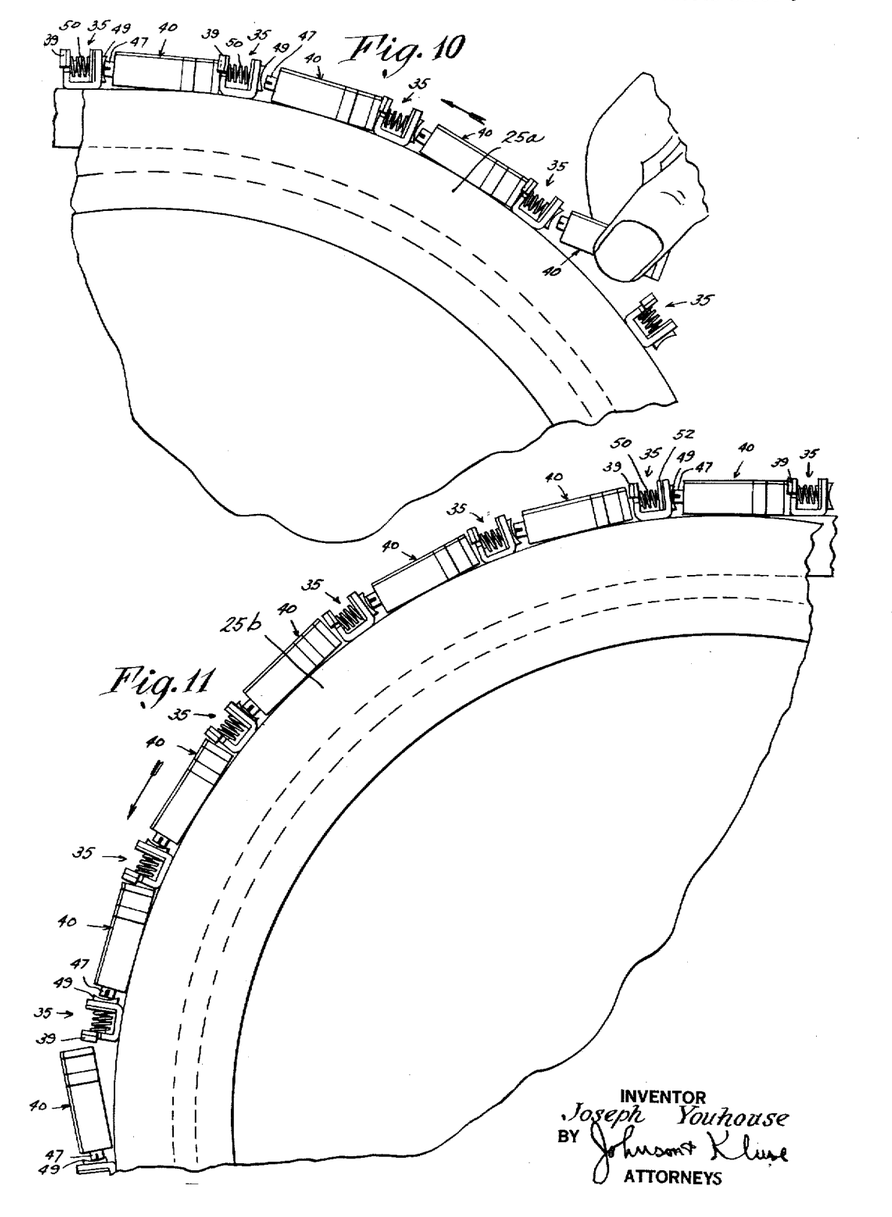
Fig. 10 is a fragmentary side elevation of the conveying belt and head pulley of the apparatus, showing the increased spacing between the belt cleats, and the manner of placing the thermostats in position.
Fig. 11 is a fragmentary side elevation of the belt and tail pulley, showing the increased spacing and the manner in which the thermostats automatically fall by gravity at the discharge end of the apparatus.

Referring to Figs. 10 and 11, the thermostat conveying means comprising the belt 34 and cleats 35, is so arranged that when passing over the pulleys 25a and 25b the cleats will release their hold on the thermostats. As a result, at the head pulley 25a situated at the intake end of the apparatus, the thermostats may be quickly and conveniently placed on the belt, and at the discharge end of the apparatus, adjacent the tail pulley 25b, the thermostats may be automatically removed from the belt by merely dropping therefrom under the action of gravity. This is due to the fact that, since the cleats 35 are secured along the outside surface of the belt 34, when the latter is curved around the periphery of either of the pulleys 25a or 25b, the spacing between the cleats 35 will increase a substantial extent, this being clearly shown in the figures. At the beginning of the increase in the cleat spacing, where the belt 34 begins to flex, upon approaching and engaging the periphery of a pulley, the springs 50 of the cleats will expand until the flanges 52 of the plungers 49 engage the inside surfaces of the cleat walls 38. As the flexing of the belt 34 continues to the point where it conforms to the curvature of the pulley, the additional spacing will be such that the thermostats 40 will no longer be gripped or frictionally held by the cleats.

This is an important feature of the invention, since as shown in Fig. 10 the thermostats 40 may be easily placed by an operator on the belt 34 at the head pulley 25a of the machine. As the pulley 25a turns counterclockwise and the belt 34 straightens out, the thermostats 40 will be clamped between the cleats 35 and frictionally held thereby, the coil springs 50 having been compressed an extent so that a constant pressure is being maintained by the plungers 49.

Also, at the discharge end of the apparatus, where the tail pulley 25b is located, those thermostats which have been allowed to remain on the belt 34 will, in passing over the pulley, be released so that they may fall by gravity into a container 56.

According to the present invention, as shown in Figs. 1 and 2, a plurality of stations 57 and 58 are provided along the upper path of travel of the belt 34, at which stations thermostats 40 which have been incorrectly adjusted or set will be automatically removed from the belt. Preferably, at the station 57, the thermostats which have been set for too low a temperature will be removed, and at the station 58 the thermostats which have been set for too high a temperature will be removed.

Prior to the thermostats approaching the stations 57 and 58 they are heated, so as to enable their response to be determined. This heating may be accomplished by radiation, or convection, or by a combination of these. However, the heating is preferably accomplished by high-frequency coils 59 and 60, which are energized from exciters or generators 61 and 62 respectively, Figs. 1 and 2.

Considering the station 57, Fig. 2, as the belt 34 advances from right to left carrying the thermostats 40 on its outside surface, the thermostats will pass through the field of, and axially through the coil 59, since the latter is made to encircle the belt 34. The eddy currents induced in the bimetallic arms 44 of the thermostats will cause these to heat up quickly and flex in a direction to open the circuit by separating from the ends 45 of the terminal screws 46. Since the housing 42 of the thermostat is all of molded insulating material, this will not interfere with the high-frequency field and with the heating of the arms 44. Referring to Fig. 9, the housings 42 are provided with insulating covers 63 which also permit unobstructed passage of the high-frequency field.

Upon leaving the coil 59 and entering the station 57 the thermostats 40, while still heated, pass in front of a plunger 64 pivotally mounted at 65 on the end of an extension of a core 66 of a solenoid 67, the latter being rigidly secured to the table 21 of the apparatus. At the station 57 the belt 34 is closely guided and supported. As shown in Fig. 4, the belt passes over a channel-shaped guide 68 which is mounted on a block 69 secured to the table 21, the guide 68 preventing lateral or sidewise movement of the belt. Blocks 70 and 71 are mounted on the table 21 along each side of the block 69, and guide plates 72 and 73 are secured to the upper surfaces of the blocks 70 and 71 respectively, for further guiding the belt 34.

If, after being heated by the high-frequency coil 59, the thermostats 40 have responded to such an extent that the bi-metallic arms 44 are separated from the contacting ends 45 of the terminal screws 46, indicating that the thermostats are open-circuited, the solenoid 67 is made operative by a novel circuit arrangement, so that it actuates the plunger 64 and causes the latter to forcibly strike the open-circuited thermostat, overcoming the frictional grip of the cleats 35 and removing the thermostat from the belt laterally, down a chute 74 into a container 75.

The energization of the high-frequency coil 59 and the speed of the belt 34 are so adjusted that a thermostat 40 which reaches the station 57 in open-circuit condition is adjusted to too low a setting, and therefore all thermostats carried by the belt, which are set too low will be removed from the belt and deposited in the container 75. The speed of the belt 34 is uniform, so that each thermostat is subjected to the high-frequency field for a given predetermined length of time, and as a result, since the field itself is held to a constant strength, each thermostat is heated to exactly the same predetermined temperature.

The control circuit for the solenoid 67 comprises a pair of contact shoes 76 and 77 mounted by means of spring urged plungers 78 and 79 so as to extend along opposite sides of the belt 34. As shown in Fig. 2, the plungers 78 and 79 are slidably carried in metal blocks 80 and 81 respectively, the blocks being respectively mounted on the upper surfaces of the guide plates 73 and 72.

The shoe 76 is sufficiently long so that it bridges for a short period of time each succeeding pair of cleats 35 that approach it when the belt 34 is in motion. The contact shoe 77 is shorter than the shoe 76, however, being located directly opposite the latter, and its length is such that it cannot at any time bridge two adjacent cleats 35. A third contact shoe 82 is provided, pivotally mounted on the guide plate 72 and located so that it may engage the terminal screws 46 of the thermostats 40 during the time that the shoe 76 is bridging two cleats and the shoe 77 not touching any of the cleats. As shown in Fig. 3, the contact shoe 82 is charged by a suitable spring 83, and limited in its movement by a pin 84 anchored in the guide plate 72. The relative locations of the shoes 82 and 77 are such that the latter shoe, when not touching any of the cleats 35 engages an advancing cleat before the shoe 82 disengages the terminal screw 46 of the following advancing thermostat 40. Also, the shoe 77 is not disengaged from said cleat 35 when the latter is leaving the station 57 until the shoe 82 has first engaged the terminal screw 46 of the next succeeding thermostat 40 advancing on the station.

Since the cleats 35 are of metal, part of the time periodically during the movement of the belt 34 the contact shoes 76 and 77 will be bridged by one of the cleats 35. During the periods that the contact shoes 76 and 77 are not being bridged by one of the cleats 35, the shoes 76 and 82 may be bridged by a thermostat 40 located at the station 57, provided the thermostat is in close-circuited condition.

If, however, due to the heating by the high-frequency coil 59 the thermostat has responded beyond the predetermined limit indicating that it was set too low, its open-circuit condition will not cause a bridging of the shoes 76 and 82. This occasion is utilized by the invention to cause energization of the solenoid 67 so that the plunger 64 is caused to forcibly advance and remove the open-circuited thermostat from the belt.

The circuit for accomplishing this energization of the solenoid 67 is as follows: One end of the solenoid is connected to a supply line 85, the other end being connected by a wire 86 to the armature 87 of a relay 88. The contact 89 of the relay cooperating with armature 87 is connected to the other supply line 90. The contact shoes 77 and 82 are connected together by a wire 91, which is connected by a wire 92 to one end of the relay coil 93, the other end of the coil being connected by a wire 94 to the supply line 85. The contact shoe 76 is connected by a wire 95 to the supply line 90.

According to these connections, when the shoes 76 and 77 are bridged by the cleats 35, the relay 88 will be energized, maintaining the armature 87 away from the contact 89 so that the solenoid 67 is deenergized. If a thermostat 40 should advance to the station 57 and remain in close-circuited condition, indicating that it is not adjusted too low, the circuit through the relay 88 will be maintained during the period the shoes 76 and 77 are not bridged by a cleat 35, because of the bridging of the shoes 76 and 82 by the closed thermostat. Therefore the solenoid 67 will not be energized and the close-circuited thermostat 40 will be permitted to proceed on the belt past the station 57. If, however, the thermostat 40 at the station 57 is open-circuited, indicating it has been set too low, at the time the contacts 76 and 77 are not bridged by a cleat 35 the relay circuit will be broken and the solenoid 67 energized, and the plunger 64 will remove the thermostat from the belt.

The thermostats 40 which have been allowed to pass by the station 57 will next approach the station 58, and in so doing will be heated by the high-frequency coil 60. Upon reaching the station 58, if the thermostats 40 are open-circuited they will be allowed to proceed on the belt past the station, to be discharged into the container 56 under the pulley 25a. If, however, the thermostats at the station 58 are close-circuited, indicating that they are set for too high a temperature, they will be struck from the belt 34 and passed down a chute 96 into a container 97 for "high" thermostats. For this arrangement, the energization of the high-frequency coil 60, together with its spacing from the station 58, are adjusted so that thermostats which are set too high will not be open-circuited upon reaching the station 58, whereas thermostats which are set correctly will remain open-circuited at this station.

The removal of the thermostats 40 from the belt 34 at the station 58 is accomplished by a plunger 98 pivotally mounted at 99 on a core extension 100 of the core 101 of a solenoid 102. One end of the solenoid coil 102 is connected to the supply line wire 85, and the other end is connected by a wire 103 to the armature 104 of a relay 105. The contact 106 of the relay cooperating with the armature 104 is connected with the supply line 90. One end of the coil 107 of the relay 105 is connected by a wire 108 to the supply line 85, and the other end of the coil is connected by a wire 109 to a pivotally mounted, spring urged contact shoe 110 adapted to engage the terminal screws 46 of the thermostats on the belt 34. A second contact shoe 111 is mounted on spring charged plungers 112 to extend along one side of the belt 34, and is connected by a wire 113 to the supply line 90.

The shoes 110 and 111 are so located that they may simultaneously engage, respectively, a terminal screw of a thermostat 40 at the station 58, and the leading cleat 35 which clamps and holds the said thermostat. If the thermostat is in open-circuit condition while at the station 58, indicating that it is not set too high but set correctly, the relay 105 will not be energized, and the thermostat will be allowed to proceed on the belt 34 to be discharged as it passes around the pulley 25b. However, if the thermostat 40 at the station 58 should be close-circuited, indicating that it is set too high, the relay 105 will be energized, causing energization of the solenoid 102, and resulting in the plunger 98 striking the thermostat from the belt into the chute 96, from which it passes into the container 97.

It will thus be seen that, by the present invention, there is provided a quick-acting, novel and simple, automatic apparatus to which thermostats may be fed one at a time in quick succession, the thermostats being moved through the apparatus without stopping, and being tested during such movement and segregated into groups, one group having correctly set thermostats, another having thermostats set too low, and a third having thermostats set too high. The "low" thermostats, discharged from the belt 34 at the station 57 and deposited in the container 75, may be removed from the machine at any time without interfering with the latter's operation. Similarly, the "high" thermostats, discharged from the belt at the station 58 and deposited in the container 97 may be removed without stopping the machine, as well as the correctly set thermostats which travel the entire upper length of the belt and are dropped into the container 56.

Adjustment of the machine may be readily accomplished by changing the speed of the belt 34 through the speed changer 30, changing the spacing of the high-frequency coils 59 and 60 from the respective stations 57 and 58, and increasing or decreasing the energization of the coils 59 and 60, or by a combination of any of these.

Since the thermostats 40 are not immersed in a wet fluid, their testing is accomplished under dry conditions similar to the conditions of actual use, and therefore thermostats are produced which are more accurately set, and operate more satisfactorily when in use.

The response of the bimetallic arms 44 to the induction heating is particularly rapid and uniform, since the eddy currents which are induced in the arms exist in a comparatively large part of a bimetallic mass.

Of the entire thermostat, the only metallic parts are the bimetallic arm and the supporting and contacting screws, since the thermostat housing is of insulating material, and therefore the heating is being applied to the essential parts involved in the test, and is not being used to heat unnecessarily other parts of the thermostat not being tested.

By the use of induction heating the thermostats may be tested after being completely assembled and encased, since the high-frequency field is not affected by the insulating casing, and therefore dust and dirt may be kept away from the thermostat contacts both before and after the testing, and may not adversely affect the thermostat functioning.

If through an inadvertence either of the solenoids 67 or 102, when energized, should not be deenergized quickly enough to cause the associated plungers to retract out of the paths of the oncoming cleats 35, the pivotal connections 65 and 99 of the plungers will come into play to permit the plungers to move with the cleats without causing damage to the structures involved. Coil springs 65a and 99a are associated with the pivotal connections of the plungers 64 and 99 respectively, so that when this occurs the plungers will be returned to aligning positions upon deenergization of the solenoids and retraction of the cores thereof.

A pair of fluorescent lamps 114 and 115 are provided, located adjacent the high-frequency coils 59 and 60 respectively to indicate when these coils are being energized or excited.

Figure 5:
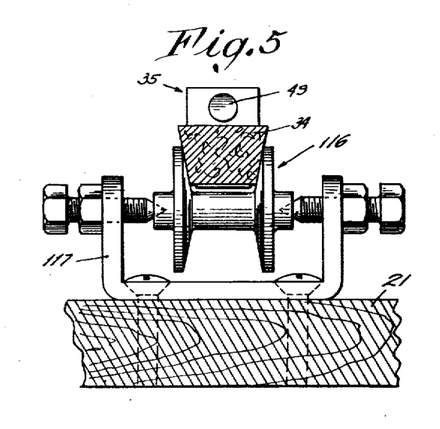
Fig. 5 is a fragmentary section taken on the line 5—5 of Fig. 1.

At intervals along the bed or table 21 idler pulleys 116 are provided, for carrying the belt 34, Figs. 1 and 5, the pulleys being supported by brackets 117 secured to the table 21.

According to the present invention the apparatus is made automatic to the extent that a skilled operator is not needed to operate the machine for sorting the thermostats 40 correctly. In accomplishing this, in addition to the determination of the response of the thermostats 40, and the rejection or passing of the latter at the stations 57 and 58 being automatically done, means are provided whereby the belt 34 may not be driven without also simultaneously energizing the high-frequency exciters 61 and 62 for the coils 59 and 60.

Referring to Fig. 1, the motor 31 which drives the belt 34 is energized from power lines 118 and 119, which lines are also connected to the coil 120 of a relay 121. One of the relay contacts is connected by a wire 122 to the line 119, and the other relay contact by a wire 123 to a jumper 124 between one set of terminal posts of the high-frequency exciters 61 and 62. A jumper 125 connecting the other terminals of the exciters is connected by a wire 126 to the line wire 118, and a motor switch 127 is interposed in the said line wire between the connections to the wire 126 and to the relay coil 120.

Thus, when the motor switch 127 is turned on, the relay 120 will be energized, automatically closing the circuit of the exciters 61 and 62.

Preferably the speed of the belt 34 is sufficiently slow, and the distance of the head pulley 25a from the coil 59 sufficiently great that, by the time a thermostat 40 which has been placed on the belt at the pulley 25a reaches the coil, the exciter 61 for the coil will have warmed up, so that the coil is energized and ready to heat the thermostat for the test.

Thus, it is not possible for a "low" thermostat to pass the station 57 because the operator inadvertently forgot to switch on and allow to heat up the exciters 61 and 62, since this switching and heating is automatically taken care of by the relay 121, and also by the time lag occurring between the placing of a thermostat on the belt 34 and the arrival of the thermostat at the coil 59.

Variations and modifications may be made within the scope of this invention and portions of the improvements may be used without others.

I claim:

1. Apparatus for segregating thermostats which respond differently to heat, comprising means for holding a plurality of thermostats; induction heating means for heating said thermostats, said holding means and heating means being relatively movable for heating the thermostats by induction successively a predetermined extent; means for determining the presence of response of the heated thermostats; and means controlled by said last-named means for removing from the holding means the thermostats which have responded within a given range to the said heating.

2. Apparatus for segregating thermostats which respond differently to heat, comprising a resilient belt for holding and conveying a plurality of thermostats in succession; means including a high-frequency coil through which the belt passes, for heating the thermostats successively; means for determining the presence of response of the heated thermostats; and means controlled by said last-named means for removing from the belt the thermostats which have responded within a given range to the said heating.

3. Apparatus for segregating thermostats having a physically movable part which responds differently to heat, comprising means for conveying the thermostats in succession to a given point; means for heating the thermostats successively prior to their arrival at said point; means for determining whether the movable part of the thermostats has moved more than a predetermined extent in response to said heating; and means controlled by said last-named means for automatically removing from the conveying means the thermostats which have responded more than said predetermined extent, and the thermostats which have responded less than said predetermined extent.

4. Apparatus for segregating thermostats which respond differently to heat, comprising means for conveying the thermostats in succession along a line of travel; means for heating the thermostats successively at two separate points in said line of travel; means for determining whether the thermostats have responded more than a predetermined extent to said heatings; and means controlled by said last-named means for automatically removing from the conveying means the thermostats which have responded more than said predetermined extent after one of said heatings, and for automatically removing the thermostats which have responded less than said predetermined extent after the other of said heatings.

5. Apparatus for segregating circuit controlling thermostatic devices which respond differently to heat, comprising means for conveying the devices in succession to a given point; means for heating the devices successively by electro-magnetic waves prior to their arrival at said point produced by said heating; means passing a current through the circuit controlling thermostatic device; and means responsive to open-circuit condition of the devices at said point for automatically removing the said devices from the conveying means.

6. Apparatus for segregating thermostatic devices having a movable circuit-controlling part which responds differently to heat, comprising means for conveying the devices in succession to a given point; high frequency means for heating the devices successively prior to their arrival at said point; and means responsive to the condition of the circuit through said movable part of the devices at said point as produced by said heating for automatically removing the said devices from the conveying means.

7. Apparatus for segregating circuit-controlling thermostatic devices which respond differently to heat, comprising an endless belt for carrying the devices in succession to a given point; high frequency means for heating the devices while on the belt and prior to their arrival at said given point; and means responsive to open-circuit condition of the devices at said point produced by said heating for automatically removing the said devices from the belt.

8. Apparatus for segregating circuit-controlling thermostatic devices which respond differently to heat, comprising an endless belt for carrying the devices in succession to a given point; high frequency means for heating the devices while on the belt and prior to their arrival at said given point; and means responsive to closed-circuit condition of the devices at said point produced by said heating for automatically removing the said devices from the belt.

9. Apparatus for segregating circuit-controlling thermostatic devices which respond differently to heat, comprising an endless belt for carrying the devices in succession past a given point to a second given point; high frequency means for heating the devices while on the belt and prior to their arrival at one of said points; means responsive to open-circuit condition of the devices at said one point for automatically removing the said devices from the belt; a second high frequency means for heating the devices while on the belt and prior to their arrival at the other of said points; and means responsive to closed-circuit condition of the devices at said other point for automatically removing the said devices from the belt.

10. Apparatus for segregating circuit-controlling thermostatic devices which respond differently to heat, comprising means for conveying the devices in succession past a given point to a second given point; external means for heating the devices by electromagnetic waves prior to their arrival at said first point; means responsive to open-circuit condition of the devices at said first point for automatically removing the said devices from the conveying means; external means for heating the remaining devices by electromagnetic waves subsequent to their passing the said first point and prior to their arrival at the said second point; and means responsive to closed-circuit condition of the devices at said second point for automatically removing the said devices from the conveying means.

11. Apparatus for segregating thermostatic devices having a movable circuit-controlling part which responds differently to heat, comprising means for conveying the devices in succession past a given point to a second given point; means for heating the devices prior to their arrival at said first point; means responsive to open-circuit position of the movable part of the devices at said first point for automatically removing the said devices from the conveying means; means for heating the remaining devices subsequent to their passing the said first point and prior to their arrival at the said second point; means responsive to closed-circuit position of the movable part of the devices at said second point for automatically removing the said devices from the conveying means; and means for automatically removing from the conveying means, at a third point, the devices which have been carried past the said second point on said means.

12. Apparatus for segregating thermostats which respond differently to heat, comprising a pair of pulleys; an endless belt passing over the pulleys; cleats secured at intervals along the outside surface of the belt, said cleats being adapted to engage and frictionally clamp the thermostats between them where the belt is straight, the spacing between the cleats becoming greater where the belt is curved around the pulleys so that at these points the cleats release the thermostats; means for successively heating thermostats carried by the belt between the cleats thereof; means for determining the extent of response of the heated thermostats; and means controlled by said last-named means for removing from the belt the thermostats which have responded within a given range to the said heating, the thermostats remaining on the belt being automatically removed therefrom when the belt becomes curved in passing over one of said pulleys.

13. Apparatus for segregating thermostats which respond differently to heat, comprising a pair of pulleys; an endless belt passing over the pulleys; cleats secured at intervals along the outside surface of the belt, said cleats having resilient means for engaging and frictionally clamping the thermostats between the cleats where the belt is straight, the spacing between the cleats becoming greater where the belt is curved around the pulleys so that at these points the cleats release the thermostats; means for successively heating thermostats carried by the belt between the cleats thereof; means for determining the extent of response of the heated thermostats; and means controlled by said last-named means for removing from the belt the thermostats which have responded within a given range to the said heating, the thermostats remaining on the belt being automatically removed therefrom when the belt becomes curved in passing over one of said pulleys.

14. Apparatus for segregating thermostatic switching devices which respond differently to heat, comprising a pair of pulleys; an endless belt passing over the pulleys; cleats secured at intervals along the outside surface of the belt, said cleats being adapted to engage and frictionally clamp the switching devices between them where the belt is straight, the spacing between the cleats becoming greater where the belt is curved around the pulleys so that at these points the cleats release the switching devices; means for successively heating switching devices carried by the belt between the cleats thereof; electrical means for determining whether the contacts of the devices are in engagement after the said heating, including a pair of terminals on the exterior of each device, connected with the contacts of the device, one of said terminals connecting electrically with a cleat clamping the device, and said means including a pair of contact members which are stationary with respect to the belt and are adapted to engage respectively the said cleat and the other terminal of the device; and means connected with said electrical means, for removing from the belt the switching devices whose contacts have not opened in response to the said heating, the devices which remain on the belt being automatically removed therefrom when the belt becomes curved in passing over one of said pulleys.

15. Apparatus for segregating thermostatic switching devices which respond differently to heat, comprising a pair of pulleys; an endless belt passing over the pulleys; cleats secured at intervals along the outside surface of the belt, said cleats being adapted to engage and frictionally clamp the switching devices between them where the belt is straight, the spacing between the cleats becoming greater where the belt is curved around the pulleys so that at these points the cleats release the switching devices; means for successively heating switching devices carried by the belt between the cleats thereof; electrical means for determining whether the contacts of the devices are in engagement after the said heating, including a pair of terminals on the exterior of each device, connected with the contacts of the device, one of said terminals connecting electrically with a cleat clamping the device, said means including a pair of contact members which are stationary with respect to the belt and are adapted to engage respectively the said cleat and the other terminal of the device, and including a relay connected with said contact members; and means connected with said relay, for removing from the belt the switching devices whose contacts have not opened in response to the said heating, said means including a solenoid located adjacent the belt, adapted to drive the thermostatic devices from between the cleats of the belt, the devices which remain on the belt being automatically removed therefrom by gravity when the belt becomes curved in passing over one of said pulleys.

16. Apparatus for segregating thermostatic switching devices which respond differently to heat, comprising a pair of pulleys; an endless belt passing over the pulleys; cleats secured at intervals along the outside surface of the belt, said cleats being adapted to engage and frictionally clamp the switching devices between them where the belt is straight, the spacing between the cleats becoming greater where the belt is curved around the pulleys so that at these points the cleats release the switching devices; means for successively heating switching devices carried by the belt between the cleats thereof; electrical means for determining whether the contacts of the devices are in engagement after the said heating, including a pair of terminals on the exterior of each device, connected with the contacts of the device, one of said terminals connecting electrically with a cleat clamping device, said means including a pair of contact members which are stationary with respect to the belt and are adapted to engage respectively the said cleat and the other terminal of the device, and including a relay connected with said contact members; and means connected with said relay, for removing from the belt the switching devices whose contacts have opened in response to the said heating, said means including a solenoid located adjacent the belt, adapted to drive the thermostatic devices from between the cleats of the belt, and including a third contact member adapted to engage the belt cleats, the devices which remain on the belt being automatically removed therefrom by gravity when the belt becomes curved in passing over one of said pulleys.

17. Apparatus for segregating thermostatic switching devices which respond differently to heat, comprising means for conveying a plurality of said devices in succession past a given point, said means including a movable carrier having a plurality of insulated metal clamping members located at spaced intervals on the carrier, said members being adapted to frictionally hold the said devices between them; means for successively heating the switching devices while on the carrier and prior to reaching the said point; electrical means for determining whether the contacts of the devices are in engagement when the devices have reached said point after being heated, said devices having exterior terminals connected respectively to their contacts, one of said terminals of each device engaging and connecting electrically with a clamping member, and said electrical means including a pair of stationary contact shoes adapted to respectively engage the clamping members and the other terminals of the devices, and including a relay connected in circuit with said shoes; and means connected with the relay for removing from the carrier the switching devices whose contacts have not opened in response to the said heating.

18. Apparatus for segregating circuit-controlling thermostatic devices which respond differently to heat, comprising a pair of pulleys; an endless belt passing over the pulleys for conveying the devices in succession past a given point to a second given point, said points being located between the pulleys; clamping means for the thermostatic devices, said means being carried by the belt and adapted to spread apart as the belt passes over the pulleys so that the said devices may be, without restraint, mounted on or removed from the belt at the pulleys; means for heating the devices while on the belt and prior to their arrival at said first point; means responsive to open-circuit condition of the devices at said first point for overcoming the restraint of the clamping means and automatically removing the said devices from the belt; means for heating the remaining devices while on the belt subsequent to their passing the said first point and prior to their arrival at the said second point; and means responsive to closed-circuit condition of the devices at said second point for overcoming the restraint of the clamping means and automatically removing the said devices from the belt, the remaining devices which pass by the said second point being automatically removed from the belt where the latter passes over the pulley located beyond the said second point.

19. Apparatus for segregating circuit-controlling thermostatic devices which respond differently to heat, comprising an endless belt passing over a pair of pulleys, for conveying the devices in succession past a given point located between the pulleys; clamping means for the thermostatic devices, said means being carried by the belt and being adapted to spread apart as the belt passes over the pulleys so that the said devices may be, without restraint, mounted on or removed from the belt at the pulleys; means for heating the devices while on the belt and prior to their arrival at said point; and means responsive to open-circuit condition of the devices at said point for overcoming the restraint of the clamping means and automatically removing the said devices from the belt, the remaining devices which pass the said point being automatically removed from the belt where the latter passes over the pulley located beyond the said point.

JOSEPH YOUHOUSE.

REFERENCES CITED

The following references are of record in the file of this patent:

UNITED STATES PATENTS

| Number | Name | Date |
| --- | --- | --- |
| 706,177 | Heaphy | Aug. 5, 1902 |
| 807,718 | Brown | Dec. 19, 1905 |
| 958,252 | Jenkins | May 17, 1910 |
| 1,661,323 | Crosthwait, Jr. | Mar. 6, 1928 |
| 1,762,859 | Gebhard | June 10, 1930 |
| 1,808,301 | Ferguson | June 2, 1931 |
| 1,955,794 | DuMont | Apr. 24, 1934 |
| 2,026,079 | White | Dec. 31, 1935 |
| 2,095,355 | Cate | Oct. 12, 1937 |
| 2,237,254 | Brockhuysen | Apr. 1, 1941 |
| 2,259,111 | Laidig | Oct. 14, 1941 |
| 2,376,056 | Heyer | May 15, 1945 |
| 2,383,756 | Williams | Aug. 28, 1945 |

Certificate of Correction

Patent No. 2,571,643 October 16, 1951

JOSEPH YOUHOUSE

It is hereby certified that error appears in the printed specification of the above numbered patent requiring correction as follows:

Column 11, line 18, strike out "produced by said heating" and insert the same in line 21, after "point";

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*